(12) United States Patent
Hasegawa et al.

(10) Patent No.: US 6,631,050 B1
(45) Date of Patent: Oct. 7, 2003

(54) SEALING GLASS FOR MAGNETIC HEAD AND MAGNETIC HEAD USING THE SAME

(75) Inventors: Shinya Hasegawa, Ibaraki (JP); Tetsuya Kamimoto, Hirakata (JP); Hideo Torii, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 45 days.

(21) Appl. No.: 09/786,456

(22) PCT Filed: Jun. 29, 2000

(86) PCT No.: PCT/JP00/04268

§ 371 (c)(1),
(2), (4) Date: Jun. 4, 2001

(87) PCT Pub. No.: WO01/03128

PCT Pub. Date: Jan. 11, 2001

(30) Foreign Application Priority Data

Jul. 2, 1999 (JP) .......................................... H11-189237

(51) Int. Cl.[7] .............................................. G11B 5/235
(52) U.S. Cl. ...................................................... 360/120
(58) Field of Search ................................. 360/120, 128, 360/122

(56) References Cited

U.S. PATENT DOCUMENTS 3,562,444 A * 2/1971 Hoogendoorn ........... 360/234.7
5,029,032 A    7/1991 Yamada et al.

FOREIGN PATENT DOCUMENTS

| DE | 4105877 | 9/1991 |
|---|---|---|
| JP | 62-158611 | 10/1987 |
| JP | 3-265539 | 11/1991 |
| JP | 5-46915 | 2/1993 |
| JP | 7-6313 | 1/1995 |
| JP | 7-37223 | 2/1995 |
| JP | 7-161011 | 6/1995 |
| JP | 7-220218 | 8/1995 |
| JP | 8-180310 | 7/1996 |
| JP | H8-277144 | 10/1996 |
| JP | H11-157874 | 6/1999 |

* cited by examiner

Primary Examiner—A. J. Heinz
(74) Attorney, Agent, or Firm—RatnerPrestia

(57) ABSTRACT

Because of its composition that is liable to be crystallized and therefore has a low strength, a conventional sealing glass for magnetic head has a problem in that in a manufacturing process for manufacturing a magnetic head having a narrow track width and a short gap length corresponding to the high-density recording in recent years with high accuracy, cracks are liable to be developed in a sealing glass portion by an impact caused in cutting and grinding a head chip. By using glass having a composition of 13 to 17 wt % $SiO_2$, 5 to 6.8 wt % $B_2O_3$, 70 to 77 wt % PbO, 0.1 to 5 wt % of at least one of $Al_2O_3$ and ZnO, and 0.1 to 3 wt % of at least one of $Na_2O$ and $K_2O$ as a front sealing glass and using glass having a composition of 3 to 9 wt % $SiO_2$, 11 to 17 wt % $B_2O_3$, 66 to 77 wt % PbO, and 3 to 15 wt % of at least one of $Al_2O_3$ and ZnO as a back sealing glass, a high-performance magnetic head having a high strength can be provided in high yields.

5 Claims, 5 Drawing Sheets

(a)

(b)

(a)

(b)

SEALING GLASS FOR MAGNETIC HEAD AND MAGNETIC HEAD USING THE SAME

THIS APPLICATION IS A U.S. NATIONAL PHASE APPLICATION OF PCT INTERNATIONAL APPLICATION PCT/JP00/04268. The present invention relates to a magnetic head suitable for recording/reproducing of great amounts of magnetic information on a magnetic recording medium, and further relates to a sealing glass for joining a pair of magnetic core halves configuring such a magnetic head.

TECHNICAL FIELD

The present invention relates to a magnetic head suitable for recording/reproducing of great amounts of magnetic information on a magnetic recording medium, and further relates to a sealing glass for joining a pair of magnetic core halves configuring such a magnetic head.

BACKGROUND ART

In recent years, magnetic recording media with a high coercive force have been used with decreasing size and increasing capacity of a magnetic recording/reproducing apparatus. The development of a magnetic head for high-density magnetic recording, having a capability of sufficiently writing signals on such a medium, has been demanded strongly. The magnetic head is designed so as to be capable of being used for a high-capacity magnetic recording medium by using a magnetic material having a high value of saturation magnetic flux density as a core and by decreasing a gap length. For example, for this purpose, there has been proposed a Metal-in-Gap (MIG) head in which the gap facing surfaces of magnetic core halves are coated with a magnetic substance with a high saturation magnetic flux density (for example, Fe—Ta—N, Fe—Nb—N, Fe—Nb—Si—B—N, Co—Ta—Zr—Nb, or Co—Nb—Zr—N, hereinafter abbreviated as a magnetic substance) in a thin film shape.

FIG. 2 shows a construction of an MIG head. Metallic ferromagnetic films 3 and 4 with a high saturation magnetic flux density are formed on the magnetic gap facing surfaces of magnetic core halves 1 and 2 made of ferrite, and the magnetic gap facing surfaces are butted together via a magnetic gap material 5 and are fixed to each other by sealing glasses 6 and 7.

The MIG head is manufactured by a process shown in FIG. 3 on the whole. First, a coil groove 10 and glass grooves 11 are formed in a pair of ferrite cores (a). Then, track grooves 12 for regulating track width are formed (b). Further, metallic ferromagnetic films 3 and 4 (not shown) are formed on magnetic gap facing surfaces having been ground, and a film of a magnetic gap material 5 (not shown) is formed on the metallic ferromagnetic film 3, 4. Next, the magnetic gap facing surfaces are butted together and a front sealing glass 6 and. a back sealing glass 7 are disposed (c), and thereafter the paired core halves are joined to each other by heat treatment (d). Thus, a magnetic core block in which sealing glasses are molded to join the ferrite cores is cut to a predetermined thickness and ground, by which a magnetic head chip 13 is manufactured (e). This magnetic head chip is subjected to treatment such as base bonding and wire coiling, thereby completing a magnetic head.

When the sealing glasses 6 and 7 are molded, the operation must be performed usually at about 500° C. to prevent the magnetic characteristics of magnetic film from being impaired. The back sealing glass 7 on the back gap side is filled by heating and softening glass and pouring it, by using sealing glass whose working point is about 500° C. The proper working point of the back sealing glass is 490 to 520° C. The working point is defined as a. temperature at which the viscosity of glass is about $10^3$ Pa·s. Also, in order to reduce the occurrence of cracks of magnetic head caused by distortion or other faults and to manufacture magnetic heads in high yields, the coefficient of thermal expansion of the back sealing glass should preferably be $(75 \text{ to } 100) \times 10^{-7}$° $C.^{-1}$ (for example, Japanese Patent Application Laid-Open No. 8-180310).

On the other hand, the front sealing glass 6 for joining the front gap side is filled by being pushed in from the front gap side at a heating temperature of about 500° C. while a pressure is applied to the glass, by using a sealing glass having a working point higher than 500° C. The reason for this is that if the front sealing glass 6 is filled by pouring glass having a low working point, since low-viscosity glass is liable to react with magnetic film, gap collapse or air bubble is produced, so that the magnetic characteristics are deteriorated. Therefore, using glass having a working point slightly higher than the heating temperature, contrivance is made to reduce the reaction by pushing in the glass while applying a pressure in a state of high viscosity. At this time, the working point of the front sealing glass should preferably be 540 to 560° C. Also, from the viewpoint of output characteristics of magnetic head, in order to produce a proper distortion on the magnetic substance, the coefficient of thermal expansion of the front sealing glass should preferably be $(80 \text{ to } 95) \times 10^{-7}$° $C.^{-1}$ (for example, Japanese Patent Application Laid-Open No. 7-161011).

As sealing glass for magnetic head that meets the above condition, for the sealing glass on the front gap side, glass having a composition of 6 to 17 wt % $SiO_2$, 7 to 16 wt % $B_2O_3$, 60 to 77 wt % PbO, 0 to 13 wt % ZnO, 0 to 2 wt % $Al_2O_3$, 0 to 1 wt % $K_2O$, 0 to 3 wt % $Na_2O$, 0 to 5 wt % $La_2O_3$, and 0 to 5 wt % BaO on an oxide basis has so far been used, and for the sealing glass on the back gap side, glass having a composition of 1 to 6 wt % $SiO_2$, 7 to 10 wt % $B_2O_3$, 60 to 78 wt % PbO, 10 to 25 wt % ZnO, 0 to 3 wt % $Al_2O_3$, 0 to 8 wt % of $ZrO_2$, and 0 to 3 wt % BaO on an oxide basis has so far been used (for example, Japanese Patent Application Laid-Open Nos. 7-161011 and 8-180310).

As described above, since a high impact is given during cutting and grinding operations in the manufacturing process for magnetic head, cracks sometimes occur in the sealing glass, which has a relatively lower strength than any material constituting the magnetic head, which finally causes cracks in the magnetic head. Therefore, the front and back sealing glasses are required to have a high strength.

Further, in recent years, in order to increase the density of magnetic recording on a medium, a magnetic head having a narrower track width and a shorter gap length than before has been demanded. As a manufacturing method for obtaining a magnetic head having a narrow track width and a short gap length with high accuracy, a method has been proposed in which a pair of magnetic core halves are butted together, and are first fixed by only a back sealing glass, and then a front sealing glass is molded after a track width on the front gap side is regulated (for example, Japanese Patent Application Laid-Open Nb. 7-220218).

FIG. 4 shows the outline of the manufacturing process. As is shown in FIG. 3, the coil groove 10 and the glass grooves 11 and the track grooves 12 are formed in a pair of ferrite core halves, and the metallic ferromagnetic films 3 and 4

(not shown) and the film of the magnetic gap material 5 (not shown) are formed on the magnetic gap facing surfaces having been ground. Then, the back sealing glass 7 is disposed on the butted paired core halves (c), and after heating, the back gap side is first joined. The nearby portion of a magnetic core block having been made in unit form is fabricated to regulate a track width of the butted portion on the front gap side. Thereafter, the front sealing glass 6 is disposed (d), and the front gap side is filled by reheating (e). The magnetic core block is cut and ground, by which the magnetic head chip 13 is manufactured. This magnetic head chip is subjected to treatment such as base bonding and wire coiling, thereby completing a magnetic head. By this manufacturing method, a magnetic head with a high-accuracy narrow track width without track shift and a stable gap length accuracy can be obtained.

However, for general glass materials, crystals are sometimes deposited in glass by heat treatment. For most glass materials, microcrystals are deposited on the glass surface in large amounts and the distribution thereof is nonuniform, so that cracks are liable to be generated, by which the apparent strength of glass material is decreased. In particular, in the method for manufacturing the above-described magnetic head for high-density recording, the back sealing glass is heated two times, so that crystals are liable to be deposited in the glass. Nonuniform deposition of crystals in the sealing glass decreases the strength thereof. Therefore, when the core having been made in unit form after sealing is cut and ground, cracks develop in the joint portion.

The glass material referred to as so-called crystallized glass is a material whose apparent strength is increased by the uniform deposition of microcrystals in the whole glass by means of heat treatment, different from the crystallization of many glass materials. However, because the composition of crystallized glass is limited, it is difficult to obtain a material having desired physical properties. Also, because the heat treatment conditions during use are limited, the material cannot be used practically in many cases. The sealing glass used for the magnetic head is required to meet many conditions including working point, coefficient of thermal expansion, chemical durability, or the like suitable for the specifications of the magnetic head. Therefore, it is desirable to select amorphous glass that has a high degree of freedom of composition and is less prone to be crystallized.

Therefore, the above-described sealing glass for magnetic head preferably has a high strength caused by the fact that it is not crystallized under the heating condition in the magnetic head manufacturing process, in addition to having the optimum working point and coefficient of thermal expansion.

However, the sealing glass having a composition proposed in Japanese Patent Application Laid-Open Nos. 7-161011 and 8-180310 has not been developed considering the problems of crystallization and strength. Therefore, when the magnetic head is manufactured by the manufacturing method that realizes the above-described high-density recording, since the strength of the front and back sealing glasses is insufficient, cracks are generated, and sometimes cracking and chipping are caused in the magnetic head.

DISCLOSURE OF THE INVENTION

The present invention has been achieved to solve the above problems, and accordingly an object thereof is to provide a high-performance magnetic head in which cracks in sealing glass and cracking and chipping of head are less prone to occur even when the magnetic head is manufactured because the glass is not crystallized and therefore the chip strength of head can be increased.

To attain the above object, the present invention provides a front sealing glass and back sealing glass for magnetic head.

The front sealing glass has a chemical composition of 13 to 17 wt % $SiO_2$, 5 to 6.8 wt % $B_2O_3$, 70 to 77 wt % PbO, 0.1 to 5 wt % of at least one of $Al_2O_3$ and ZnO, and 0.1 to 3 wt % of at least one of $Na_2O$ and $K_2O$ on an oxide basis, and preferably has a composition of 16 to 17 wt % $SiO_2$, 5 to 6.8 wt % $B_2O_3$, 75.5 to 77 wt % PbO, 0.1 to 5 wt % of at least one of $Al_2O_3$ and ZnO, and 0.1 to 3 wt % of at least one of $Na_2O$ and $K_2O$ on an oxide basis.

The back sealing glass has a chemical composition of 3 to 9 wt % $SiO_2$, 11 to 17 wt % $B_2O_3$, 66 to 77 wt % PbO, and 3 to 15 wt % of at least one of $Al_2O_3$ and ZnO on an oxide basis, and preferably has a composition of 3 to 9 wt % $SiO_2$, 11 to 17 wt % $B_2O_3$, 68 to 77 wt % PbO, 4 to 14 wt % of at least one of $Al_2O_3$ and ZnO on an oxide basis.

Further, the present invention provides a high-performance magnetic head in which a pair of magnetic core halves, in which a coil groove is provided at least on one side, and a metallic ferromagnetic film is formed on at least one gap facing surface, are joined by butting the gap facing surfaces together via a magnetic gap meterial, joining the front gap side by using the front sealing glass, and joining the back gap side by using the back sealing glass.

EXPLANATION OF REFERENCE NUMERALS

Figure 1:
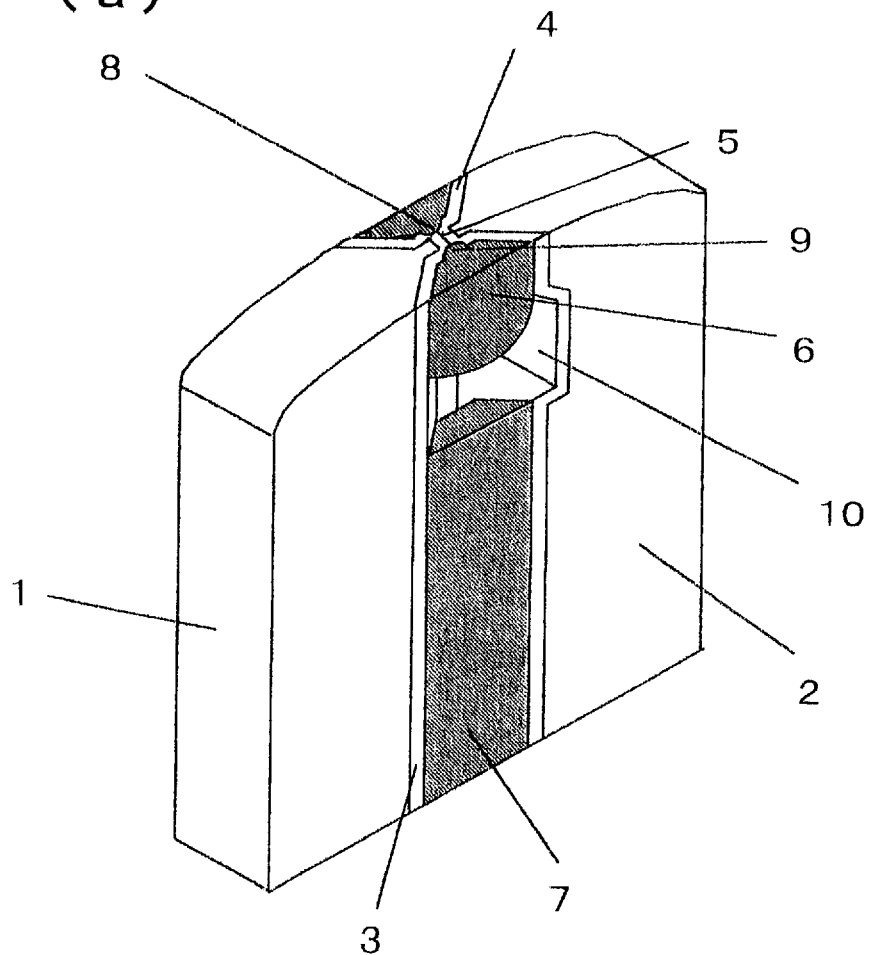
FIG. 1(a) is a perspective view of a magnetic head in accordance with one embodiment of the present invention.
FIG. 1(b) is a plan view of an essential part of the magnetic head.
Figure 1:
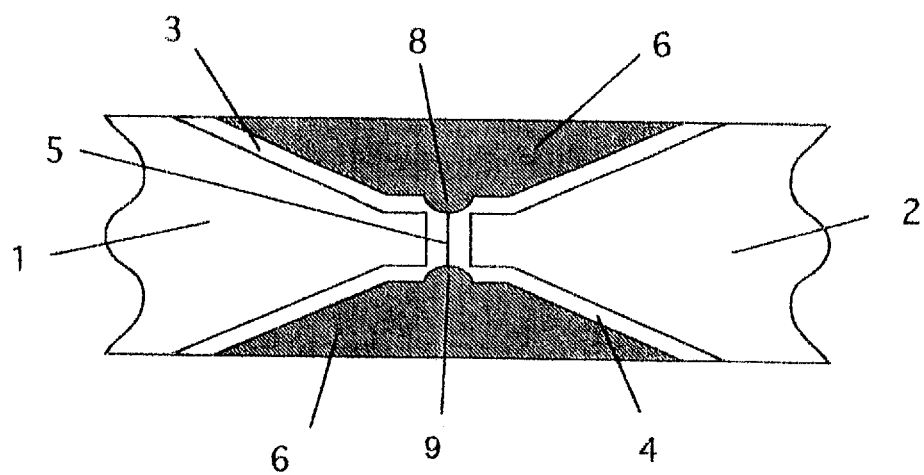

1, 2 magnetic core half
3, 4 metallic ferromagnetic film
5 magnetic gap material
6 front sealing glass
7 back sealing glass
8, 9 track width regulating groove
10 coil groove
11 glass groove
12 track groove
13 magnetic head chip
14 jig
15 load testing machine

BEST MODE FOR CARRYING OUT THE INVENTION

Embodiment 1

An embodiment of the present invention will now be described.

A magnetic head in accordance with the present invention is characterized in that a pair of magnetic core halves, in which a coil groove is provided at least on one side, and a metallic ferromagnetic film is formed on at least one gap facing surface, are joined by butting the gap facing surfaces together via a magnetic gap meterial, joining the front gap side by using a front sealing glass, and joining the back gap side by using a back sealing glass.

The front sealing glass in accordance with the present invention is sealing glass for magnetic head characterized by having a composition of 13 to 17 wt % $SiO_2$, 5 to 6.8 wt % $B_2O_3$, 70 to 77 wt % PbO, 0.1 to 5 wt % of at least one of $Al_2O_3$ and ZnO, and 0.1 to 3 wt % of at least one of $Na_2O$ and $K_2O$ on an oxide basis, and preferably having a composition of 16 to 17 wt % $SiO_2$, 5 to 6.8 wt % $B_2O_3$, 75.5 to 77 wt % PbO, 0.1 to 5 wt % of at least one of $Al_2O_3$ and ZnO, and 0.1 to 3 wt % of at least one of $Na_2O$ and $K_2O$ on an oxide basis. Since the magnetic head using this front sealing glass has a high strength, a high-performance magnetic head can be obtained in high yields.

The back sealing glass in accordance with the present invention is sealing glass for magnetic head characterized by having a composition of 3 to 9 wt % $SiO_2$, 11 to 17 wt % $B_2O_3$, 66 to 77 wt % PbO, and 3 to 15 wt % of at least one of $Al_2O_3$ and ZnO on an oxide basis, and preferably having a composition of 3 to 9 wt % $SiO_2$, 11 to 17 wt % $B_2O_3$, 68 to 77 wt % PbO, 4 to 14 wt % of at least one of $Al_2O_3$ and ZnO on an oxide basis. If this back sealing glass is used, glass is not crystallized in the magnetic head manufacturing process, so that a high strength is attained. Therefore, a high-performance magnetic head can be obtained in high yields.

The following is a description of the magnetic head and the sealing glass for magnetic head in accordance with the embodiment of the present invention.

Figure 2:
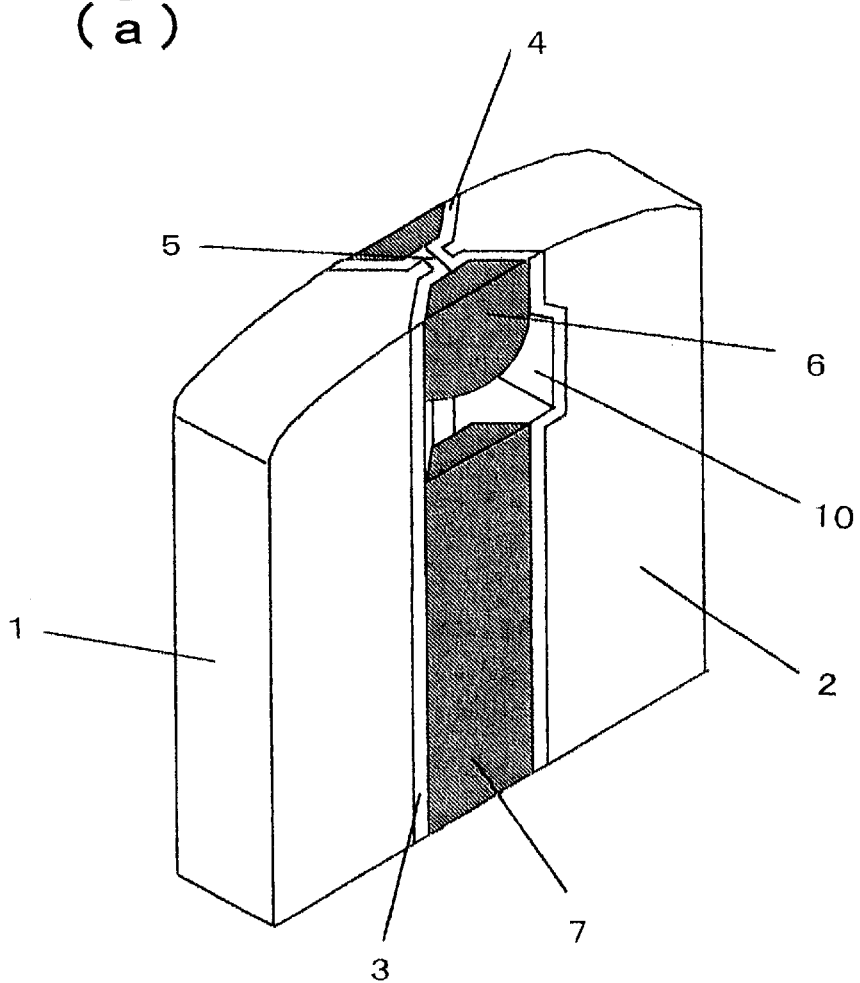
FIG. 2(a) is a perspective view of a conventional magnetic head.
FIG. 2(b) is a plan view of an essential part thereof.
Figure 2:
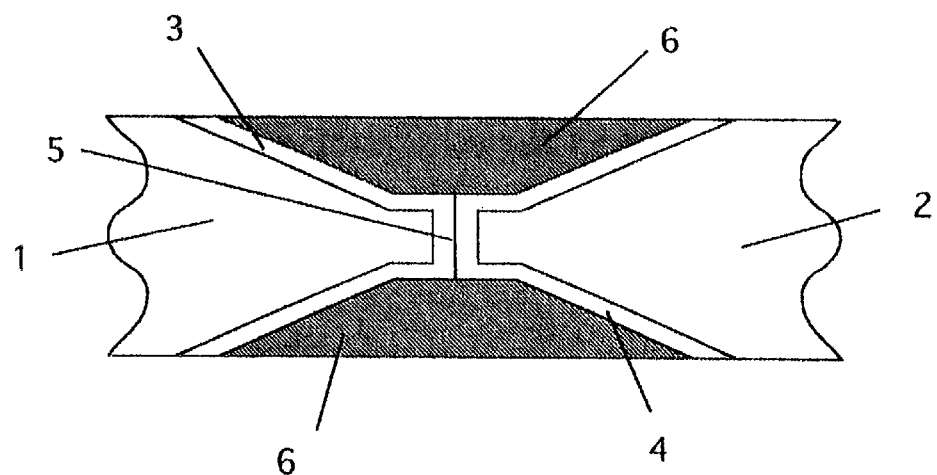
Figure 3:
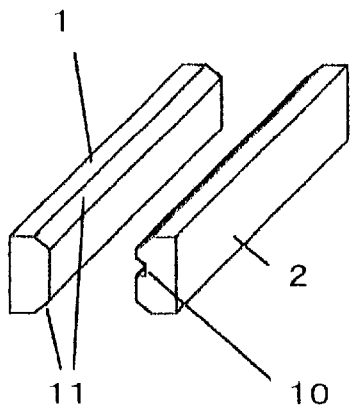
FIGS. 3a–e are explanatory views showing a process for manufacturing the conventional magnetic head.
Figure 3:
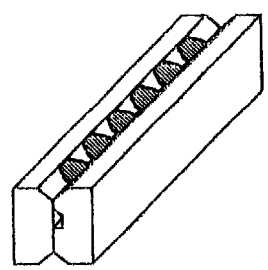
Figure 3:
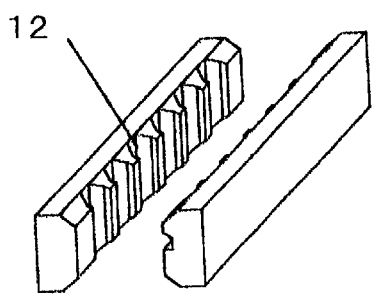
Figure 3:
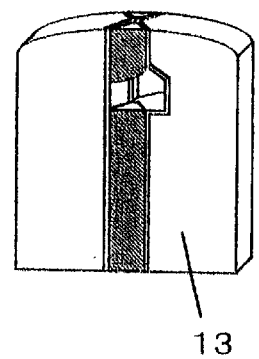
Figure 3:
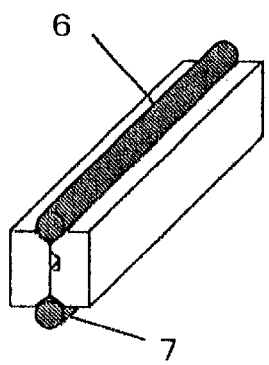
Figure 4:
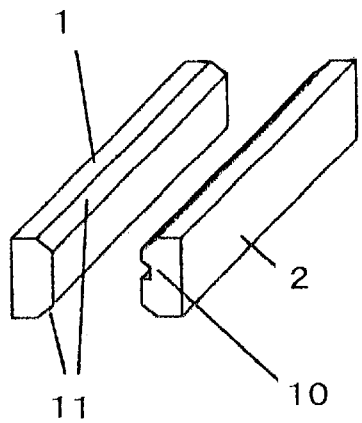
FIG. 4 is an explanatory view showing a process for manufacturing the magnetic head in accordance with one embodiment of the present invention.
Figure 4:
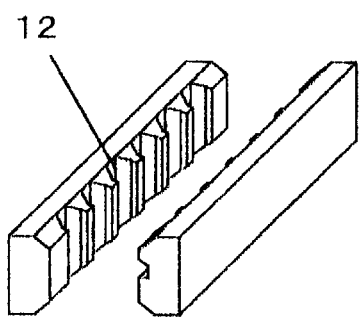
Figure 4:
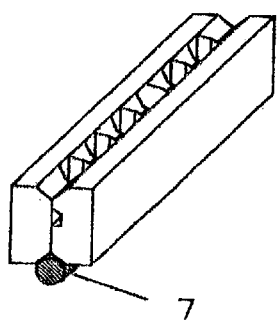
Figure 4:
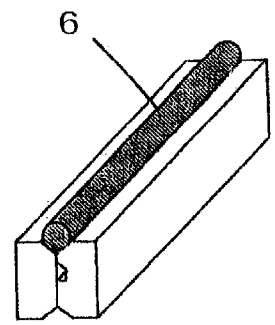
Figure 4:
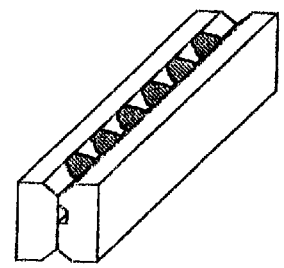
Figure 4:
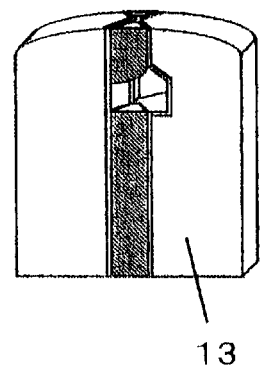

FIG. 1 shows the magnetic head in accordance with one embodiment of the present invention. The metallic ferromagnetic films 3 and 4 with a high saturation magnetic flux density are formed on the magnetic gap facing surfaces of the magnetic core halves 1 and 2 made of ferrite, and the magnetic gap material 5 is formed between the metallic ferromagnetic films 3 and 4. Also, the joining at a core gap is performed by the front sealing glass 6 and the back sealing glass 7. Although this magnetic head basically has the same construction as that of the conventional magnetic head shown in FIG. 2, the track width is regulated by the manufacturing method shown in FIG. 4 to increase the track width accuracy, and track width regulating grooves 8 and 9 are formed in the nearby portion of front gap.

For the magnetic core, metallic ferromagnetic film, magnetic gap material, or the like in this magnetic head, a material having been used conventionally can basically be used.

The front sealing glass of this embodiment, of the sealing glasses used in the magnetic head in accordance with the embodiment of the present invention, is characterized by having a composition of 13 to 17 wt % $SiO_2$, 5 to 6.8 wt % $B_2O_3$, 70 to 77 wt % PbO, 0.1 to 5 wt % of at least one of $Al_2O_3$ and ZnO, and 0.1 to 3 wt % of at least one of $Na_2O$ and $K_2O$ on an oxide basis, and preferably having a composition of 16 to 17 wt % $SiO_2$, 5 to 6.8 wt % $B_2O_3$, 75.5 to 77 wt % PbO, 0.1 to 5 wt % of at least one of $Al_2O_3$ and ZnO, and 0.1 to 3 wt % of at least one of $Na_2O$ and $K_2O$ on an oxide basis.

The reason for limiting the content of each component is as described below, and the support data therefor is described later.

The content of $SiO_2$ lower than 13 wt % decreases the chip strength. Also, if the content of $SiO_2$ is higher than 17 wt %, the working point undesirably exceeds 560° C. If the content of $B_2O_3$ is lower than 5 wt %, the working point exceeds 560° C., and if it is higher than 6.8 wt %, the chip strength decreases. If the content of PbO is lower than 70 wt %, the working point exceeds 560° C., and if it is higher than 77 wt %, the chip strength decreases. The glass of this embodiment contains much PbO to attain a low working point, and on the other hand, the glass has a low water resistance. Therefore, to improve this property, it is preferable that the glass contain at least one of $Al_2O_3$ and ZnO of 0.1 wt % and more. However, if the total content of $Al_2O_3$ and ZnO is higher than 5 wt %, the working point undesirably exceeds 560° C. $Na_2O$ and $K_2O$ plays a role in lowering the melting point and regulating the coefficient of thermal expansion, so that at least one of these components of 0.1 wt % and more is preferably contained. However, the total content of $Na_2O$ and $K_2O$ is higher than 3 wt %, the coefficient of thermal expansion increases undesirably. The actual treatment temperature at which the operation of such front sealing glass is performed is about 500° C. This is because a temperature higher than this value deteriorates the magnetic characteristics of the metallic ferromagnetic film.

Further, the back sealing glass in accordance with the embodiment of the present invention is characterized by having a composition of 3 to 9 wt % $SiO_2$, 11 to 17 wt % $B_2O_3$, 66 to 77 wt % PbO, and 3 to 15 wt % of at least one of $Al_2O_3$ and ZnO on an oxide basis, and preferably having a composition of 3 to 9 wt % $SiO_2$, 11 to 17 wt % $B_2O_3$, 68 to 77 wt % PbO, and 4 to 14 wt % of at least one of $Al_2O_3$ and ZnO on an oxide basis.

The reason for limiting the content of each component is as described below, and the support data therefor is described later. The content of $SiO_2$ lower than 3 wt % decreases the chip strength. Also, if the content of $SiO_2$ is higher than 9 wt %, the working point undesirably exceeds 520° C. If the content of $B_2O_3$ is lower than 11 wt %, the working point exceeds 520° C., and if it is higher than 17 wt %, the chip strength decreases. If the content of PbO is lower than 66 wt %, the working point exceeds 520° C., and if it is higher than 77 wt %, the coefficient of thermal expansion increases. The glass of the present invention contains much PbO to attain a low working point, and on the other hand, the glass has a low water resistance. Therefore, to improve this property, it is preferable that the glass contain at least one of $Al_2O_3$ and ZnO of 3 wt % and more. However, if the total content of $Al_2O_3$ and ZnO is higher than 15 wt %, the glass is crystallized after heat treatment in the head manufacturing process, so that the chip strength decreases undesirably. It is preferable that the actual treatment temperature at which the operation of such back sealing glass is performed be about 500° C.

The present invention will now be described with reference to practical examples, but the present invention is not limited to these practical examples.

PRACTICAL EXAMPLE 1

As the front sealing glass, glass of various compositions that has a working point of 540 to 560° C. and a coefficient of thermal expansion of $(80$ to $95)\times10^{-7}$° $C.^{-1}$ was synthesized. The glass was manufactured by putting a predetermined raw material in a platinum crucible, melting it in an electric furnace at 1000 to 1100° C. for one hour, and rapidly quenching the melted material. Tables 1 to 7 give the compositions, working points, and coefficients of thermal expansion at 30 to 300° C. of various kinds of glass synthesized as practical examples (Nos. 2, 3, 4, 7, 8, 9, 12, 13, 14, 17, 18, 19, 20, 25, 26, 27, 31, 32, 33, 34, 39, 40 and 41) of the present invention and comparative examples (Nos. 1, 5, 6, 10, 11, 15, 16, 21, 22, 23, 24, 28, 29, 30, 35, 36, 37, 38, 42 and 43).

Also, the water resistance was indicated by a decrease in weight per unit area. The decrease was measured by immersing a cubic glass specimen one side of which is 10 mm in boiled ion exchange water for one hour. This value should preferably be 1.0 mg/cm$^2$ and lower in order to use this glass as the sealing glass for magnetic head.

Figure 5:
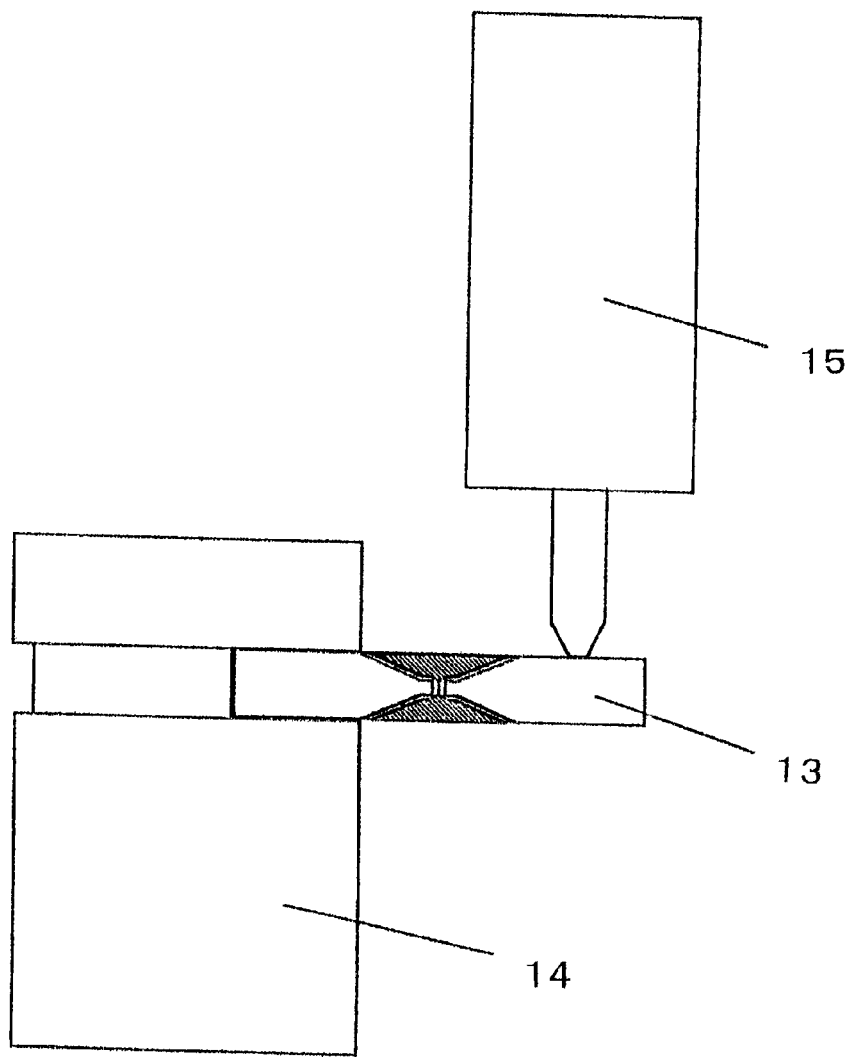
FIG. 5 is a view showing a method for measuring chip strength.

Also, of the kinds of manufactured glass, glass having a working point of 540 to 560° C. and a high water resistance was used to manufacture the magnetic head having the construction shown in FIG. 1, and the chip strength was measured. For all magnetic heads, No. 46 glass in Table 8 was used as the back sealing glass. The chip strength was measured by using a load testing machine as shown in FIG. 5. As the measuring method, a method described in the later-described Practical example 3 was used.

TABLE 1

| No. | | Comparative example | Practical example | | | Comparative example |
|---|---|---|---|---|---|---|
| | | 1 | 2 | 3 | 4 | 5 |
| Composition (wt %) | $SiO_2$ | 12.0 | 13.0 | 16.3 | 17.0 | 18.1 |
| | $B_2O_3$ | 6.8 | 6.8 | 6.1 | 6.0 | 5.5 |
| | PbO | 76.0 | 74.6 | 76.2 | 74.9 | 75.0 |
| | $Al_2O_3$ | 1.9 | 2.5 | 0.8 | 0.5 | 0.6 |
| | ZnO | 2.0 | 2.3 | | | 0.2 |
| | $Na_2O$ | 0.5 | 0.3 | | 0.6 | 0.2 |
| | $K_2O$ | 0.8 | 0.5 | 0.6 | 1.0 | 0.4 |
| | Total | 100.0 | 100.0 | 100.0 | 100.0 | 100.0 |
| Operating temperature (° C.) | | 545 | 550 | 550 | 555 | 570 |
| Coefficient of thermal expansion (× 10$^{-7}$/° C.) | | 93 | 92 | 95 | 93 | 90 |
| Water resistance (mg/cm$^2$) | | 0.6 | 0.4 | 0.4 | 0.5 | 0.3 |
| Chip strength (gf) | | 70 | 84 | 92 | 89 | — |

TABLE 2

| No. | | Comparative example | Practical example | | | Comparative example |
|---|---|---|---|---|---|---|
| | | 6 | 7 | 8 | 9 | 10 |
| Composition (wt %) | $SiO_2$ | 15.9 | 16.6 | 16.6 | 14.7 | 13.9 |
| | $B_2O_3$ | 4.0 | 5.0 | 6.0 | 6.8 | 8.5 |
| | PbO | 76.2 | 76.0 | 75.8 | 74.3 | 72.7 |
| | $Al_2O_3$ | 2.5 | 1.4 | 0.9 | 1.5 | 0.5 |
| | ZnO | 1.0 | 0.3 | | 2.2 | 3.5 |
| | $Na_2O$ | 0.1 | 0.3 | 0.1 | | 0.4 |
| | $K_2O$ | 0.3 | 0.4 | 0.6 | 0.5 | 0.5 |
| | Total | 100.0 | 100.0 | 100.0 | 100.0 | 100.0 |
| Operating temperature (° C.) | | 565 | 560 | 555 | 555 | 550 |
| Coefficient of thermal expansion (× 10$^{-7}$/° C.) | | 91 | 92 | 93 | 90 | 91 |
| Water resistance (mg/cm$^2$) | | 0.5 | 0.4 | 0.3 | 0.4 | 0.4 |
| Chip strength (gf) | | — | 89 | 90 | 87 | 68 |

TABLE 3

| No. | | Comparative example | Practical example | | | Comparative example |
|---|---|---|---|---|---|---|
| | | 11 | 12 | 13 | 14 | 15 |
| Composition (wt %) | $SiO_2$ | 16.7 | 16.5 | 15.5 | 14.8 | 15.7 |
| | $B_2O_3$ | 6.8 | 6.7 | 6.5 | 6.5 | 5.5 |

TABLE 3-continued

|  |  | Comparative example | Practical example | | | Comparative example |
|---|---|---|---|---|---|---|
| No. |  | 11 | 12 | 13 | 14 | 15 |
|  | PbO | 68.9 | 70.0 | 76.3 | 77.0 | 78.1 |
|  | $Al_2O_3$ | 3.0 | 2.5 | 0.9 | 0.1 | 0.5 |
|  | ZnO | 1.9 | 2.2 |  | 0.9 |  |
|  | $Na_2O$ | 1.2 | 1.0 | 0.4 |  | 0.2 |
|  | $K_2O$ | 1.5 | 1.1 | 0.4 | 0.7 |  |
|  | Total | 100.0 | 100.0 | 100.0 | 100.0 | 100.0 |
| Operating temperature (° C.) |  | 565 | 555 | 545 | 545 | 545 |
| Coefficient of thermal expansion ($\times 10^{-7}$/° C.) |  | 89 | 90 | 93 | 94 | 94 |
| Water resistance (mg/cm$^2$) |  | 0.5 | 0.4 | 0.5 | 0.5 | 0.6 |
| Chip strength (gf) |  | — | 89 | 86 | 83 | 69 |

TABLE 4

|  | Comparative example | Practical example | | | | Comparative example | |
|---|---|---|---|---|---|---|---|
| No. | 16 | 17 | 18 | 19 | 20 | 21 | 22 |
| Composition (wt %) |  |  |  |  |  |  |  |
| $SiO_2$ | 14.0 | 16.6 | 16.4 | 13.2 | 14.3 | 13.5 | 15.2 |
| $B_2O_3$ | 6.7 | 6.2 | 6.5 | 5.9 | 6.7 | 5.8 | 5.5 |
| PbO | 76.7 | 75.5 | 76.6 | 74.5 | 72.3 | 73.1 | 72.0 |
| $Al_2O_3$ |  | 0.1 |  | 5.0 |  | 6.5 |  |
| ZnO |  |  | 0.1 |  | 5.0 |  | 6.5 |
| $Na_2O$ | 0.9 | 0.6 |  | 0.5 | 0.7 | 0.1 | 0.4 |
| $K_2O$ | 1.7 | 1.0 | 0.4 | 0.9 | 1.0 | 1.0 | 0.4 |
| Total | 100.0 | 100.0 | 100.0 | 100.0 | 100.0 | 100.0 | 100.0 |
| Operating temperature (° C.) | 545 | 550 | 550 | 555 | 555 | 570 | 565 |
| Coefficient of thermal expansion ($\times 10^{-7}$/° C.) | 94 | 94 | 92 | 92 | 91 | 87 | 88 |
| Water resistance (mg/cm$^2$) | 1.5 | 0.7 | 0.6 | 0.5 | 0.3 | 0.4 | 0.4 |
| Chip strength (gf) | — | 87 | 88 | 84 | 83 | — | — |

TABLE 5

|  | Comparative example | | Practical example | | | Comparative example | |
|---|---|---|---|---|---|---|---|
| No. | 23 | 24 | 25 | 26 | 27 | 28 | 29 |
| Composition (wt %) |  |  |  |  |  |  |  |
| $SiO_2$ | 13.95 | 14.00 | 16.50 | 14.20 | 13.20 | 14.60 | 14.00 |
| $B_2O_3$ | 6.70 | 6.65 | 6.40 | 6.00 | 6.50 | 6.00 | 6.20 |
| PbO | 76.70 | 76.70 | 76.00 | 74.30 | 74.60 | 72.80 | 72.70 |
| $Al_2O_3$ | 0.05 |  | 0.05 | 1.50 | 3.50 | 2.50 | 3.50 |
| ZnO |  | 0.05 | 0.05 | 3.50 | 1.50 | 3.50 | 2.50 |
| $Na_2O$ | 0.90 | 0.90 | 0.30 |  | 0.20 | 0.20 | 0.50 |
| $K_2O$ | 1.70 | 1.70 | 0.70 | 0.50 | 0.50 | 0 40 | 0.60 |
| Total | 100.00 | 100.00 | 100.00 | 100.00 | 100.00 | 100.00 | 100.00 |
| Operating temperature (° C.) | 545 | 545 | 550 | 550 | 555 | 565 | 565 |
| Coefficient of thermal expansion ($\times 10^{-7}$/° C.) | 95 | 95 | 93 | 90 | 91 | 89 | 89 |
| Water resistance (mg/cm$^2$) | 1.2 | 1.3 | 0.6 | 0.5 | 0.5 | 0.5 | 0.4 |
| Chip strength (gf) | — | — | 90 | 86 | 85 | — | — |

TABLE 6

| | Comparative example | Practical example | | | | Comparative example | |
|---|---|---|---|---|---|---|---|
| No. | 30 | 31 | 32 | 33 | 34 | 35 | 36 |
| Composition (wt %) | | | | | | | |
| $SiO_2$ | 16.6 | 14.6 | 16.1 | 15.6 | 14.7 | 14.5 | 13.2 |
| $B_2O_3$ | 6.4 | 6.8 | 6.2 | 5.5 | 6.8 | 5.8 | 6.7 |
| PbO | 72.5 | 74.4 | 76.6 | 73.1 | 72.1 | 74.9 | 74.5 |
| $Al_2O_3$ | 3.2 | 1.0 | 0.2 | 1.5 | 1.6 | 0.8 | 0.9 |
| ZnO | 1.3 | 3.1 | 0.8 | 1.3 | 1.8 | | 0.7 |
| $Na_2O$ | | 0.1 | | 3.0 | | 4.0 | |
| $K_2O$ | | | 0.1 | | 3.0 | | 4.0 |
| Total | 100.0 | 100.0 | 100.0 | 100.0 | 100.0 | 100.0 | 100.0 |
| Operating temperature (° C.) | 570 | 555 | 550 | 550 | 550 | 550 | 545 |
| Coefficient of thermal expansion ($\times 10^{-7}$/° C.) | 85 | 90 | 91 | 94 | 93 | 97 | 98 |
| Water resistance (mg/cm$^2$) | 0.3 | 0.4 | 0.3 | 0.5 | 0.7 | 0.8 | 0.7 |
| Chip strength (gf) | — | 90 | 89 | 86 | 86 | 74 | 72 |

TABLE 7

| | Comparative example | | Practical example | | | Comparative example | |
|---|---|---|---|---|---|---|---|
| No. | 37 | 38 | 39 | 40 | 41 | 42 | 43 |
| Composition (wt %) | | | | | | | |
| $SiO_2$ | 16.05 | 16.05 | 15.50 | 15.50 | 15.00 | 14.40 | 14.00 |
| $B_2O_3$ | 6.20 | 6.00 | 6.40 | 6.00 | 6.10 | 5.60 | 6.00 |
| PbO | 73.50 | 74.10 | 75.50 | 73.20 | 72.80 | 73.80 | 74.00 |
| $Al_2O_3$ | 2.20 | 3.10 | 0.60 | 1.20 | 1.70 | 1.20 | 1.20 |
| ZnO | 2.00 | 0.70 | 1.90 | 1.10 | 1.40 | 1.00 | 0.80 |
| $Na_2O$ | 0.05 | | 0.05 | 1.00 | 2.00 | 1.50 | 2.50 |
| $K_2O$ | | 0.05 | 0.05 | 2.00 | 1.00 | 2.50 | 1.50 |
| Total | 100.00 | 100.00 | 100.00 | 100.00 | 100.00 | 100.00 | 100.00 |
| Operating temperature (° C.) | 565 | 565 | 555 | 555 | 555 | 545 | 545 |
| Coefficient of thermal expansion ($\times 10^{-7}$/° C.) | 88 | 89 | 91 | 93 | 93 | 96 | 97 |
| Water resistance (mg/cm$^2$) | 0.3 | 0.4 | 0.5 | 0.4 | 0.5 | 0.5 | 0.6 |
| Chip strength (gf) | — | — | 84 | 85 | 87 | 73 | 70 |

Here, the preferable content range of $SiO_2$ can be seen from Table 1, the preferable content range of $B_2O_3$ can be seen from Table 2, and the preferable content range of PbO can be seen from Table 3. Also, the preferable content range of $Al_2O_3$ and ZnO can be seen from Tables 4 and 5, and the preferable content range of $Na_2O_3$ and $K_2O$ can be seen from Tables 6 and 7.

PRACTICAL EXAMPLE 2

As the back sealing glass, glass of various compositions that has a working point of 490 to 520° C. and a coefficient of thermal expansion of (75 to 100)$\times 10^{-70}$ C.$^{-1}$ was synthesized. The glass was manufactured by putting a predetermined raw material in a platinum crucible, melting it in an electric furnace at 1000 to 1100° C. for one hour, and rapidly quenching the melted material. Tables 8 to 12 give the compositions, working points, and coefficients of thermal expansion at 30 to 300° C. of various kinds of glass synthesized as practical examples (Nos. 45, 46, 47, 50, 51, 52, 55, 56, 57, 60, 61, 62, 63, 68, 69 and 70) of the present invention and comparative examples (Nos. 44, 48, 49, 53, 54, 58, 59, 64, 65, 66, 67, 71 and 72).

Also, the water resistance was indicated by a decrease in weight per unit area. The decrease was measured by immersing a cubic glass specimen one side of which is 10 mm in boiled ion exchange water for one hour. This value should preferably be 1.0 mg/cm$^2$ and lower in order to use this glass as the sealing glass for magnetic head.

Also, of the kinds of manufactured glass, glass having a working point of 490 to 520° C. and a high water resistance was used to manufacture the magnetic head having the construction shown in FIG. 1, and the chip strength was measured. For all magnetic heads, No. 3 glass in Table 1 was used as the front sealing glass. The chip strength was measured by using the load testing machine as shown in FIG. 5. As the measuring method, a method described in the later-described Practical example 3 was used.

TABLE 8

| | | Comparative example | Practical example | | | Comparative example |
|---|---|---|---|---|---|---|
| No. | | 44 | 45 | 46 | 47 | 48 |
| Composition (wt %) | SiO$_2$ | 2.8 | 3.0 | 6.5 | 9.0 | 10.5 |
| | B$_2$O$_3$ | 14.0 | 13.5 | 13.0 | 16.2 | 11.5 |
| | PbO | 69.4 | 70.5 | 74.9 | 71.0 | 72.0 |
| | Al$_2$O$_3$ | 1.0 | 1.0 | 3.3 | 3.8 | 2.2 |
| | ZnO | 12.8 | 12.0 | 2.3 | | 3.8 |
| | Total | 100.0 | 100.0 | 100.0 | 100.0 | 100.0 |
| Operating temperature (° C.) | | 505 | 515 | 515 | 515 | 530 |
| Coefficient of thermal expansion (× 10$^{-7}$/° C.) | | 93 | 91 | 93 | 86 | 90 |
| Water resistance (mg/cm$^2$) | | 0.7 | 0.6 | 0.5 | 0.4 | 0.3 |
| Chip strength (gf) | | 65 | 85 | 92 | 89 | — |

TABLE 9

| | | Comparative example | Practical example | | | Comparative example |
|---|---|---|---|---|---|---|
| No. | | 49 | 50 | 51 | 52 | 53 |
| Composition (wt %) | SiO$_2$ | 6.9 | 7.5 | 4.2 | 5.5 | 4.8 |
| | B$_2$O$_3$ | 9.7 | 11.0 | 15.0 | 17.0 | 18.1 |
| | PbO | 69.2 | 75.1 | 68.5 | 67.2 | 66.3 |
| | Al$_2$O$_3$ | 1.6 | 3.3 | | 3.5 | 0.4 |
| | ZnO | 12.6 | 3.1 | 12.3 | 6.8 | 10.4 |
| | Total | 100.0 | 100.0 | 100.0 | 100.0 | 100.0 |
| Operating temperature (° C.) | | 525 | 520 | 515 | 515 | 515 |
| Coefficient of thermal expansion (× 10$^{-7}$/° C.) | | 83 | 93 | 88 | 86 | 86 |
| Water resistance (mg/cm$^2$) | | 0.5 | 0.6 | 0.5 | 0.4 | 0.5 |
| Chip strength (gf) | | — | 90 | 92 | 86 | 67 |

TABLE 10

| | | Comparative example | Practical example | | | Comparative example |
|---|---|---|---|---|---|---|
| No. | | 54 | 55 | 56 | 57 | 58 |
| Composition (wt %) | SiO$_2$ | 7.5 | 6.8 | 5.5 | 5.5 | 4.1 |
| | B$_2$O$_3$ | 14.5 | 16.1 | 16.5 | 13.1 | 11.8 |
| | PbO | 64.8 | 66.0 | 67.7 | 77.0 | 78.4 |
| | Al$_2$O$_3$ | 1.0 | 0.7 | 3.5 | 1.8 | 2.1 |
| | ZnO | 12.2 | 10.4 | 6.8 | 2.6 | 3.6 |
| | Total | 100.0 | 100.0 | 100.0 | 100.0 | 100.0 |
| Operating temperature (° C.) | | 525 | 520 | 520 | 505 | 515 |
| Coefficient of thermal expansion (× 10$^{-7}$/° C.) | | 80 | 86 | 87 | 98 | 102 |
| Water resistance (mg/cm$^2$) | | 0.4 | 0.4 | 0.6 | 0.7 | 0.8 |
| Chip strength (gf) | | — | 87 | 88 | 85 | 68 |

TABLE 11

| | Comparative example | Practical example | | | | Comparative example | |
|---|---|---|---|---|---|---|---|
| No. | 59 | 60 | 61 | 62 | 63 | 64 | 65 |
| Composition (wt %) | | | | | | | |
| SiO$_2$ | 6.5 | 8.6 | 7.3 | 4.2 | 4.1 | 3.5 | 4.5 |
| B$_2$O$_3$ | 16.8 | 16.2 | 13.1 | 11.5 | 14.2 | 13.0 | 11.3 |

TABLE 11-continued

|  | Comparative example | Practical example | | | | Comparative example | |
|---|---|---|---|---|---|---|---|
| No. | 59 | 60 | 61 | 62 | 63 | 64 | 65 |
| PbO | 76.7 | 72.2 | 76.6 | 69.3 | 66.7 | 67.0 | 67.7 |
| Al$_2$O$_3$ |  | 3.0 |  | 15.0 |  | 16.5 |  |
| ZnO |  |  | 3.0 |  | 15.0 |  | 16.5 |
| Total | 100.0 | 100.0 | 100.0 | 100.0 | 100.0 | 100.0 | 100.0 |
| Operating temperature (° C.) | 495 | 510 | 510 | 515 | 515 | 515 | 520 |
| Coefficient of thermal expansion (×10$^{-7}$/° C.) | 96 | 88 | 97 | 91 | 84 | 85 | 82 |
| Water resistance (mg/cm$^2$) | 1.9 | 0.8 | 0.7 | 0.8 | 0.6 | 0.7 | 0.6 |
| Chip strength (gf) | — | 87 | 86 | 84 | 82 | 68 | 66 |

TABLE 12

|  | Comparative example | Practical example | | | | Comparative example | |
|---|---|---|---|---|---|---|---|
| No. | 66 | 67 | 68 | 69 | 70 | 71 | 72 |
| Composition (wt %) | | | | | | | |
| SiO$_2$ | 6.4 | 6.8 | 7.9 | 4.1 | 4.2 | 4.0 | 3.2 |
| B$_2$O$_3$ | 15.9 | 15.0 | 14.6 | 13.3 | 12.4 | 12.1 | 13.7 |
| PbO | 76.2 | 76.7 | 74.5 | 67.6 | 68.4 | 67.4 | 66.6 |
| Al$_2$O$_3$ | 1.5 |  | 1.5 | 6.0 | 9.0 | 7.5 | 9.0 |
| ZnO |  | 1.5 | 1.5 | 9.0 | 6.0 | 9.0 | 7.5 |
| Total | 100.0 | 100.0 | 100.0 | 100.0 | 100.0 | 100.0 | 100.0 |
| Operating temperature (° C.) | 500 | 500 | 510 | 515 | 515 | 515 | 515 |
| Coefficient of thermal expansion (×10$^{-7}$/° C.) | 95 | 96 | 93 | 87 | 89 | 84 | 84 |
| Water resistance (mg/cm$^2$) | 1.4 | 1.5 | 0.7 | 0.4 | 0.5 | 0.4 | 0.4 |
| Chip strength (gf) | — | — | 87 | 85 | 86 | 69 | 67 |

Here, the preferable content range of SiO$_2$ can be seen from Table 8, the preferable content range of B$_2$O$_3$ can be seen from Table 9, and the preferable content range of PbO can be seen from Table 10. Also, the preferable content range of Al$_2$O$_3$ and ZnO can be seen from Tables 11 and 12.

PRACTICAL EXAMPLE 3

Some kinds of glass of compositions shown in Tables 1 to 7 were used as the front sealing glass, and some kinds of glass of compositions shown in Tables 8 to 12 were used as the back sealing glass, by which the magnetic head having a configuration shown in FIG. 1 was manufactured by combining these kinds of glass.

As the sealing glass used, a fiber with a diameter of 0.5 mm and a length of 30 mm that was manufactured by drawing from melted glass was used. As the ferrite constituting the core halves of magnetic head, Mn—Zn single crystal ferrite was used. Also, as the metallic ferromagnetic film, Fe—Ta—N film having a saturation magnetic flux density (Bs) of 1.6 T was used, and as the magnetic gap material, quartz glass was used.

Table 13 gives the results of manufacture yields of manufactured magnetic head. The manufacture yield was indicated by a ratio of the number of magnetic heads in which cracking and chipping did not occur and no crack was found in the sealing glass to 500 magnetic heads manufactured. In Table 13, the yield not lower than 98% is indicated by ⊚, the yield not lower than 95% is indicated by ○, and the yield lower than 95% is indicated by X.

TABLE 13

|  |  |  | Front sealing glass | | | | | | |
|---|---|---|---|---|---|---|---|---|---|
|  |  |  | Practical example | | | | Comparative example | | |
| Manufacture yield |  |  | 3 | 8 | 9 | 13 | 1 | 10 | 15 | 43 |
| Back sealing glass | Practical example | 46 | ⊚ | ⊚ | ○ | ○ | x | x | x | x |
|  |  | 51 | ⊚ | ⊚ | ○ | ○ | x | x | x | x |
|  |  | 47 | ○ | ○ | ○ | ○ | x | x | x | x |
|  |  | 56 | ○ | ○ | ○ | ○ | x | x | x | x |
|  | Comparative example | 44 | x | x | x | x | x | x | x | x |
|  |  | 53 | x | x | x | x | x | x | x | x |
|  |  | 58 | x | x | x | x | x | x | x | x |
|  |  | 65 | x | x | x | x | x | x | x | x |

Table 14 gives the results of measurements of chip strength of the magnetic heads in which cracking and chipping did not occur and no crack was found in the sealing glass, of the manufactured magnetic heads. The chip strength was measured by the load testing machine as shown in FIG. 5. With this load testing machine, one end of a head chip was fixed by a jig 14, and a load was applied to the other end thereof by a load testing machine 15 to measure a load that breaks the chip. One hundred magnetic chips were used for measurement.

TABLE 14

| | | | Front sealing glass | | | | | | | |
|---|---|---|---|---|---|---|---|---|---|---|
| | | | Practical example | | | | Comparative example | | | |
| Chip strength (gf) | | | 3 | 8 | 9 | 13 | 1 | 10 | 15 | 43 |
| Back sealing glass | Practical example | 46 | 92 | 90 | 87 | 86 | 70 | 68 | 69 | 70 |
| | | 51 | 92 | 91 | 88 | 87 | 69 | 70 | 68 | 71 |
| | | 47 | 89 | 88 | 86 | 85 | 68 | 67 | 68 | 69 |
| | | 56 | 88 | 86 | 85 | 86 | 69 | 68 | 67 | 66 |
| | Comparative example | 44 | 65 | 66 | 63 | 66 | 58 | 69 | 55 | 56 |
| | | 53 | 67 | 68 | 65 | 64 | 57 | 57 | 56 | 56 |
| | | 58 | 68 | 67 | 66 | 65 | 55 | 54 | 55 | 57 |
| | | 65 | 66 | 65 | 66 | 63 | 56 | 55 | 58 | 58 |

As apparent from Tables 13 and 14, the magnetic heads using the front sealing glass of practical example Nos. 3, 8, 9 and 13 in accordance with the embodiment of the present invention and the back sealing glass of practical example Nos. 46, 51, 47 and 56 in accordance with the embodiment of the present invention had a high yield and a high chip strength.

Contrarily, the magnetic heads using glass of comparative example as at least one of the front sealing glass and back sealing glass had a low yield and a low chip strength.

INDUSTRIAL APPLICABILITY

As described above, if the sealing glass for magnetic head having the composition of the present invention is used, the glass is not crystallized, so that the chip strength of head can be increased. Therefore, even when the magnetic head is manufactured, cracks in sealing glass and cracking and chipping of head are less prone to occur.

Thereby, an effect that the yield of high-performance magnetic head having a narrow track width and a short gap length increases significantly can be obtained.

What is claimed is:

1. A magnetic head comprising a pair of magnetic core halves, in which a coil groove is provided at least on one side, and a metallic ferromagnetic film is formed on at least one gap facing surface, joined by butting said gap facing surfaces together via a magnetic gap material, in which the front gap side is joined with a front sealing glass, and the back gap side is joined with a back sealing glass, said front sealing glass comprising: 16 to 17 wt % $SiO_2$; 5 to 6.8 Wt % $B_2O_3$; 75.5 to 77 wt % PbO; 0.1 to 5 wt % of $Al_2O_3$, ZnO, or a mixture thereof, in which the total content of $Al_2O_3$ and ZnO is not higher than 5 wt %; and 0.1 to 3 wt % of $Na_2O$, $K_2O$, or a mixture thereof, in which the total content of $Na_2O$ and $K_2O$ is not higher than 3 wt %, on an oxide basis; and said back sealing glass comprising: 3 to 9 wt % $SiO_2$; 11 to 17 wt % $B_2O_3$; 66 to 77 wt % PbO; and 3 to 15 wt % of $Al_2O_3$, ZnO, or a mixture thereof, on an oxide basis.

2. The magnetic head of claim 1, in which the back sealing glass comprises: 3 to 9 wt % $SiO_2$; 11 to 17 wt % $B_2O_3$; 68 to 77 wt % PbO; and 4 to 14 wt % of $Al_2O_3$, ZnO or a mixture thereof.

3. The magnetic head of claim 2, in which the back sealing glass comprises: 4.1 to 9 wt % $SiO_2$; 11 to 17 wt % $B_2O_3$; 68 to 77 wt % PbO; and 4 to 14 wt % of $Al_2O_3$, ZnO, or a mixture thereof.

4. A sealing glass comprising: 16 to 17 wt % $SiO_2$; 5 to 6.8 wt % $B_2O_3$; 75.5 to 77 wt % PbO; 0.1 to 5 wt % of $Al_2O_3$, ZnO, or mixture thereof, in which the total content of $Al_2O_3$ and ZnO is not higher than 5 wt %; and 0.1 to 3 wt % of $Na_2O$, $K_2O$, or a mixture thereof, in which the total content of $Na_2O$ and $K_2O$ is not higher than 3 wt %, on an oxide basis.

5. A magnetic head comprising a pair of magnetic core halves, in which a coil groove is provided at least on one side, and a metallic ferromagnetic film is formed on at least one gap facing surface, joined by butting said gap facing surfaces together via a magnetic gap material, in which the front gap side is joined with a front sealing glass, and the back gap side is joined with a back sealing glass, said front sealing glass comprising: 13 to 17 wt % $SiO_2$; 5 to 6.8 wt % $B_2O_3$; 70 to 77 wt % PbO; 0.1 to 5 wt % of $Al_2O_3$, ZnO, or a mixture thereof, in which the total content of $Al_2O_3$ and ZnO is not higher than 5 wt %; and 0.1 to 3 wt % of $Na_2O$, $K_2O$, or a mixture thereof, in which the total content of $Na_2O$ and $K_2O$ is not higher than 3 wt %, on an oxide basis, and said back sealing glass comprising: 3 to 9 wt % $SiO_2$; 11 to 17 wt % $B_2O_3$; 68 to 77 wt % PbO; and 4 to 14 wt % of $Al_2O_3$, ZnO, or a mixture thereof, on an oxide basis.

* * * * *

UNITED STATES PATENT AND TRADEMARK OFFICE
CERTIFICATE OF CORRECTION

PATENT NO.     : 6,631,050 B1
DATED          : October 7, 2003
INVENTOR(S)    : Shinya Hasegawa et al.

It is certified that error appears in the above-identified patent and that said Letters Patent is hereby corrected as shown below:

<u>Column 18,</u>
Line 22, before the word "mixture" insert -- a --

Signed and Sealed this

Sixth Day of April, 2004

JON W. DUDAS
*Acting Director of the United States Patent and Trademark Office*